United States Patent [19]

Vanderschuit et al.

[11] Patent Number: 5,093,763
[45] Date of Patent: Mar. 3, 1992

[54] PHOTOGRAPHIC LIGHTING APPARATUS

[76] Inventors: Carl R. Vanderschuit; Joan H. Vanderschuit, both of 751 Turquoise St., San Diego, Calif. 92109

[21] Appl. No.: 729,580

[22] Filed: Jul. 15, 1991

[51] Int. Cl.$^5$ .................................. F21V 9/00
[52] U.S. Cl. ........................... 362/18; 362/32; 362/293; 362/311
[58] Field of Search .............. 362/3, 16, 17, 18, 32, 362/277, 293, 311, 351, 8

[56] References Cited

U.S. PATENT DOCUMENTS

| | | | |
|---|---|---|---|
| 2,553,100 | 5/1951 | Lynch | 362/277 |
| 3,825,335 | 7/1974 | Reynolds | 362/18 |
| 4,109,301 | 8/1978 | Wakimura | 362/16 |
| 4,129,898 | 12/1978 | Ohrstedt | 362/18 |
| 4,813,764 | 3/1989 | Morris | 362/3 |
| 5,029,309 | 7/1991 | Jones | 354/129 |

*Primary Examiner*—Allen M. Ostrager
*Assistant Examiner*—Richard R. Cole
*Attorney, Agent, or Firm*—Brown, Martin Haller & McClain

[57] ABSTRACT

A photographic lighting apparatus has a light gun with a handle and nose in which a light source is mounted, and a light guide projecting from the nose for directing a narrow beam of light from the source. The light guide has a coupling mechanism such as screw threads on its free end, and a hollow hood member is securable to the light guide via corresponding internal screw threads at one end. The hood member is of larger dimensions at its opposite end to spread the light beam, and is arranged for selectively mounting any one of a number of light controlling plates in the light beam intermediate its ends. Other hood members of different shapes and dimensions may be provided.

15 Claims, 2 Drawing Sheets

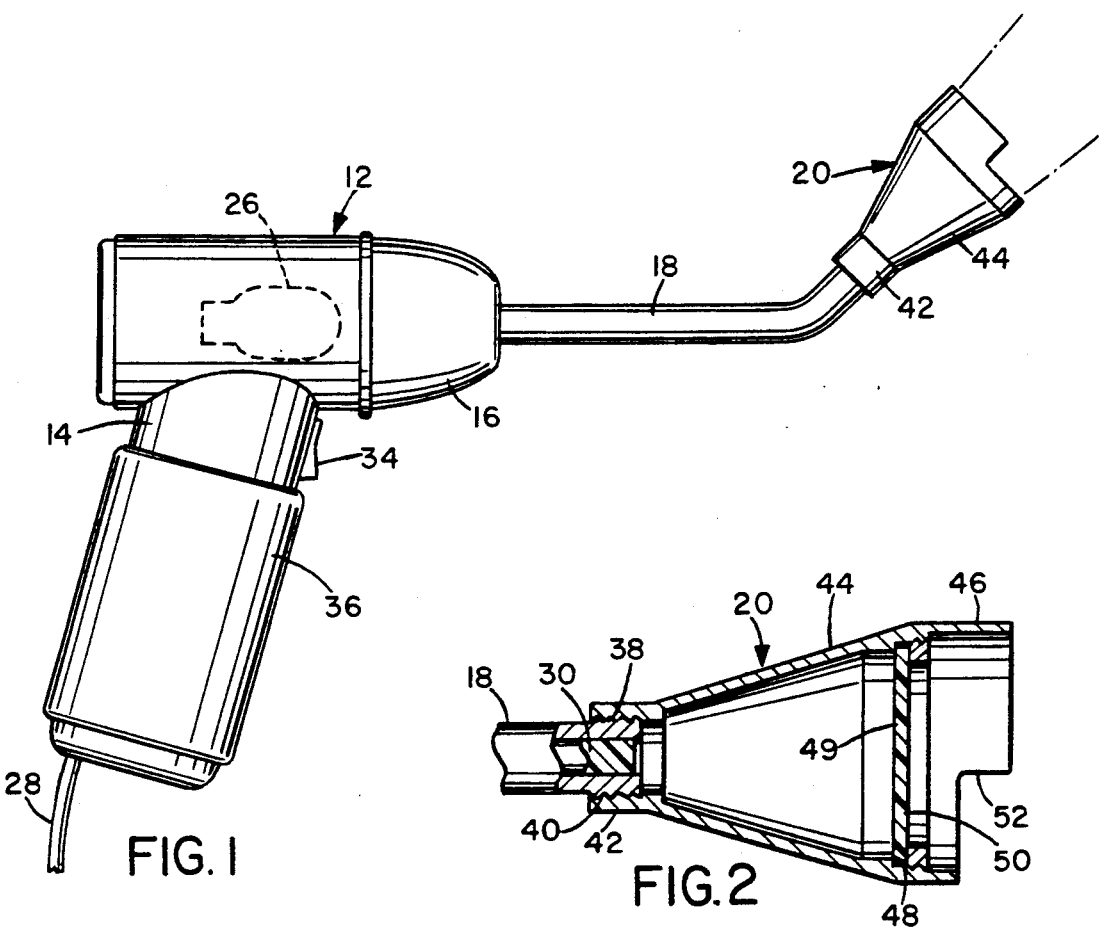
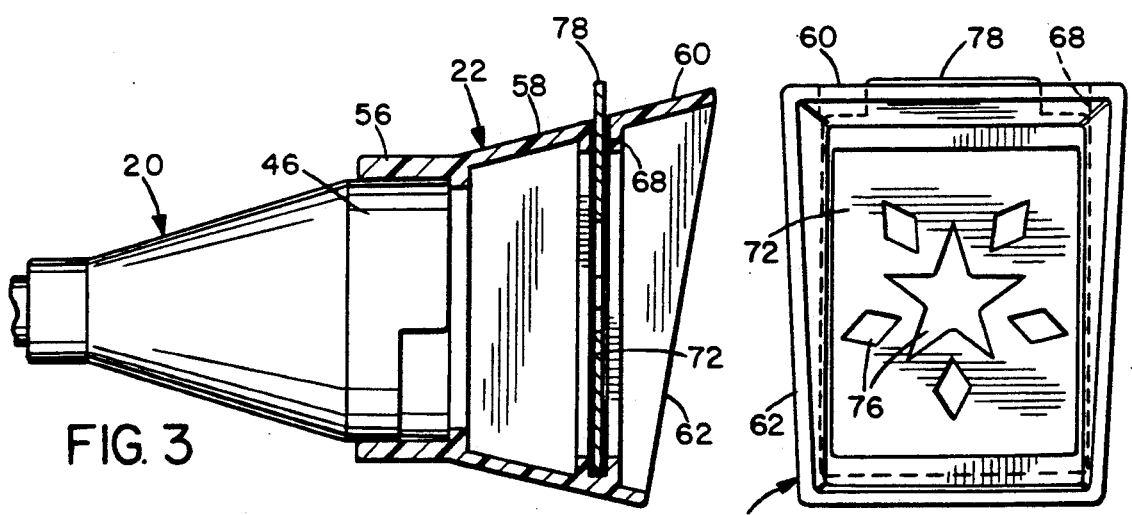
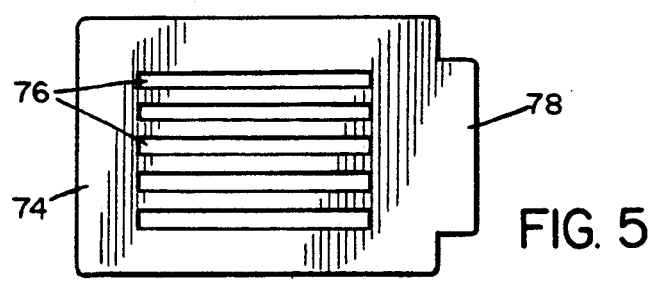

PHOTOGRAPHIC LIGHTING APPARATUS

BACKGROUND OF THE INVENTION

The present invention relates to a technique known in the video and still photography field as light painting, and is particularly concerned with an apparatus or kit for controlling and directing light at a scene to be filmed or photographed.

In standard photography, an arc light is generally used to illuminate a subject to be photographed uniformly. So-called "light painting" is used in advertizing and other photographic applications to produce special lighting and shadow effects on a scene or object to be photographed by a still or video camera. For example, a narrow beam of light may be directed across the object to produce contrasting areas of light and shadow, such as a streak of light across an object or a splotch of light on an object. Different exposures are made of the same scene with different highlighting effects, and are then combined with a partially lit exposure of the same scene so that the highlighted regions will stand out in the final combined photograph. This produces a more aesthetically pleasing, artistic end result.

One light directing device which is currently used in light painting is known as a light painting wand. This comprises a bundle of optical fibers with a fitting secured at one end which is used to direct a narrow streak of light across or onto part of a scene. A trigger is used to control operation of the camera shutter when the desired lighting effect has been created. Plastic pieces can be clipped onto the end of the fitting to vary the beam shape. One problem with this device is that it is relatively expensive.

SUMMARY OF THE INVENTION

It is an object of the present invention to provide a new and improved lighting apparatus or kit for use in photographic light painting.

According to the present invention, a lighting apparatus or kit for light painting is provided, which comprises a light directing gun having an outer casing of gun-like shape with a handle for gripping by a user, a light source in the casing for generating light in the visible light spectrum, an input for connecting the light source to a power supply, and a tubular light guide projecting from the casing for transmitting a beam of light from the gun, the light guide having a coupling mechanism such as screw threads at its free end, and at least one hood member having a co-operating coupling mechanism at one end for releasable mating engagement with the coupling mechanism on the light guide. The hood member is hollow and is of larger dimensions at its opposite, second end than at the first end. Preferably, a plurality of light controlling accessories are provided for controlling the size, shape or quality of the light beam, and the hood member has a mounting arrangement intermediate its ends for releasably mounting a selected light accessory in the hood member to intercept a light beam transmitted through the hood member.

Preferably, the outer surface of the light gun casing, light guide, and hood member are of a light absorbing, preferably black color, so that when a scene is photographed against an unlit background the apparatus itself will not be visible. The light controlling accessories preferably include filter plates for controlling the color and quality of the emitted light beam, for example gels and light diffuser plates, as well as slotted masks for shaping the light beam to produce beams of round, slit-like, square and other shapes. Several hood members of different overall shapes and dimensions may be provided for selective mounting on the end of the light guide to produce a desired basic beam shape and size from a relatively small to a large size beam. Each of the hood members has one or more mounting arrangements for receiving selected accessories for modifying the beam.

This apparatus is extremely versatile and relatively easy to use to produce a large range of different lighting effects. The handle makes the apparatus easy to support and direct while making an exposure. The apparatus is also relatively inexpensive.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a side elevation view of part of a light painting kit according to a preferred embodiment of the invention, in which the light gun has one type of light guide;

FIG. 2 is an enlarged side elevation view of the hood with portions cut away;

FIG. 3 is a partially sectioned side elevation view of the hood with a mask holding extension attached;

FIG. 4 is a front elevation view of the structure of FIG. 3;

FIG. 5 illustrates an alternative mask configuration;

DETAILED DESCRIPTION OF THE PREFERRED EMBODIMENT

Figure 6:
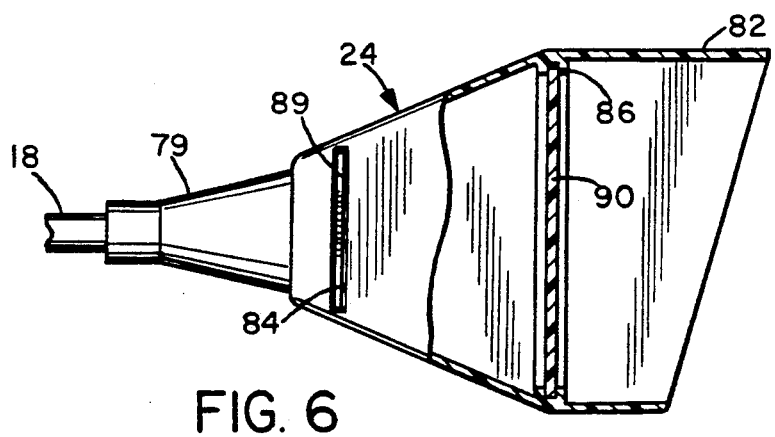
FIG. 6 is a side elevation view, partially cut away, of a light diffusing soft box or hood attached to a light guide.

The drawings illustrate a lighting apparatus or kit for use in light painting according to a preferred embodiment of the present invention. The apparatus basically comprises a light gun 12 having a handle 14 and nose cone 16 projecting transversely from the handle, with a tubular light guide 18 projecting from the end of nose 16, and a series of hoods or extension members 20, 22, 24 for releasably mounting on the end of light guide 18. FIGS. 1 to 6 illustrate various alternative accessory arrangements attached to the end of rigid light guide 18.

The light gun 12 is a modification of a unit used for curing teeth in the dental industry, for example a Spring Light Gun as manufactured by Spring Health Products of Spring City, Pa. Such light guns are normally designed to emit ultra violet (UV) light, and have an internal 12 volt 75 watt light bulb 26 with a UV filter, with a power cord 28 connecting the bulb to a power source via voltage regulator (not illustrated). A bundle of optical fibers 30 extend along the light guide to emit a controlled beam of light from the end of the guide. The dental light gun is modified for use in the light painting kit of this invention by making the outer casing of the gun black, and also coating the light guide with black paint or black material, such as black rubber. Additionally, the length of the power cord 28 is increased up to 10 feet, the UV filter is removed from the nose cone 16, and color correction filters 32 to produce the correct color balance for tungsten or daylight film are inserted in the nose cone in place of the UV filter of the dental unit. Preferably, two nose cones are provided, one for use with daylight film (80B filter) and one for use with tungsten film. A heat absorbent filter may also be added.

The light gun has an internal audible timer for control of the dental curing period. For photographic purposes, this timer is changed to a shorter, 1 second time period. The device also has an internal fan for cooling, and the speed of this fan is increased for use in the lighting apparatus. Standard on-off switch 34 is provided on handle 14, which is preferably covered with a rubber grip 36 to reduce the risk of slipping.

The outer end of the light guide 18 is modified to provide external screw threads 38 or other fastener means for releasable attachment to various light modifying accessories. FIGS. 1 and 2 of the drawings illustrate an arrangement in which the smallest of the three hood or accessory members, hood 20, is releasably secured to the end of light guide 18 via internal screw threads 40 at its smallest diameter end. Although in the illustrated embodiment of the invention the accessories are secured to the light guide via a screw threaded fastener mechanism, clearly other alternative fasteners such as bayonet type, snap fasteners, and the like may be used in alternative arrangements. Light guide 18 is releasably mounted on nose cone 16 via screw threads or similar fasteners, and can be rotated to change the position of the emitted light with precision.

Hood member 20 comprises a hollow member having a small diameter cylindrical first end 42 having internal screw threads 40, a flared, frusto-conical intermediate portion 44, and a larger diameter, cylindrical second end 46. Hood member 20 has an internal step or shoulder 48 within end 46 against which one or more light shaping or controlling accessories or plates 49 can be mounted via a suitable spring clip or retaining ring 50 or the like, as best illustrated in FIG. 2. Light controlling plates 49 may be provided with in-built filters or gels, for example, to change the quality or color of the emitted light, or may have slots or shaped openings for controlling the size and shape of the light beam. Cut-out 52 in the end 46 allows access to the mounting step or seat 48 for insertion or removal of plates 49, while the remaining, projecting portion provides a light shield.

Hood or accessory members 22 and 24 are of progressively larger dimensions, member 22 being larger than member 20 and member 24 being larger than member 22, to produce light beams of varying sizes and shapes. Hood member 24 has a small diameter first end 56 with internal screw threads equivalent to thread 40 on hood 20, for releasably mounting directly on the end of light guide 18, as generally illustrated in FIG. 6. Intermediate hood member 22 may be provided with similar internal screw threads, but in the preferred embodiment illustrated it is designed for telescopic sliding engagement over the cylindrical second end 46 of hood member 20, as generally illustrated in FIG. 3. All three hood members have a black, substantially non-reflecting outer surfaces.

The intermediate size hood member 22 comprises a hollow member having a cylindrical first end portion 56 for telescopic, sliding engagement on the end 46 of the first hood member 20, a tapering, square cross section portion 58 of gradually increasing dimensions extending from the first end portion, and a larger diameter, square or rectangular second end portion 60. The end portion 60 has an open end 62 which is tapered from the top to the bottom surface of the hood. At least one slot 68 is provided in one side wall of the hood for selective insertion or removal of a selected light shaping template 72, as best illustrated in FIGS. 3 and 4. A series of light shaping templates will be provided in the lighting kit, each having a different arrangement of openings to produce different lighting effects. Each template is of generally square or rectangular periphery matching that of the hood member bore at the location of slot 68, and has a finger tab 78 projecting from one side for easy insertion into and removal from hood member 22. Two different templates 72 and 74 are illustrated by way of example in FIGS. 4 and 5, each having openings 76 of different sizes and shapes to produce different lighting effects. Other templates will provided with one or more openings of various sizes and shapes to produce a wide range of different lighting effects.

By mounting hood member 22 on the end of the first hood member 20, the user is provided with two locations for inserting light modifying filters and light shaping templates, so that the light beam may be filtered, colored, and subsequently shaped as desired. This provides a large degree of versatility in producing different lighting effects. Clearly, hood member 22 may be used without any templates to produce a uniform, rectangular beam.

Finally, the largest, light spreading hood or soft box 24 is of similar shape but larger dimensions than hood member 22. Hood 24 comprises a hollow member having a first end 79 with internal screw threads for releasable engagement on the end of light guide 18, as mentioned above, a tapering portion 80 of rectangular cross section and gradually increasing dimensions extending from the first end, and a second, rectangular or square end portion 82 having a downwardly tapered end opening 84 similar to hood member 22. Preferably, the dimensions of the largest size end 82 of hood 24 are of the order of 3 inches by 4.5 inches. Although in the preferred embodiment illustrated, hood 24 is designed for releasable engagement directly on the end of light guide 18, it may alternatively be designed for telescopic sliding engagement over the end of hood member 20, in a similar manner to hood member 22. Member 24 has a pair of spaced slots 84, 86 in one of its side walls for slidably receiving light diffuser panels 89, 90 of corresponding shape and dimensions to those of the member 24 at the location of the respective slots. Panels 89 and 90 have light diffusing filters to produce a soft or diffuse lighting effect as is known in the photographic field. One of the filters may be used alone, or both may be used to produce even more diffuse lighting. Alternatively, hood member 24 may be used without any of the diffuser panels to produce a large, sharp beam of light.

Figure 7:
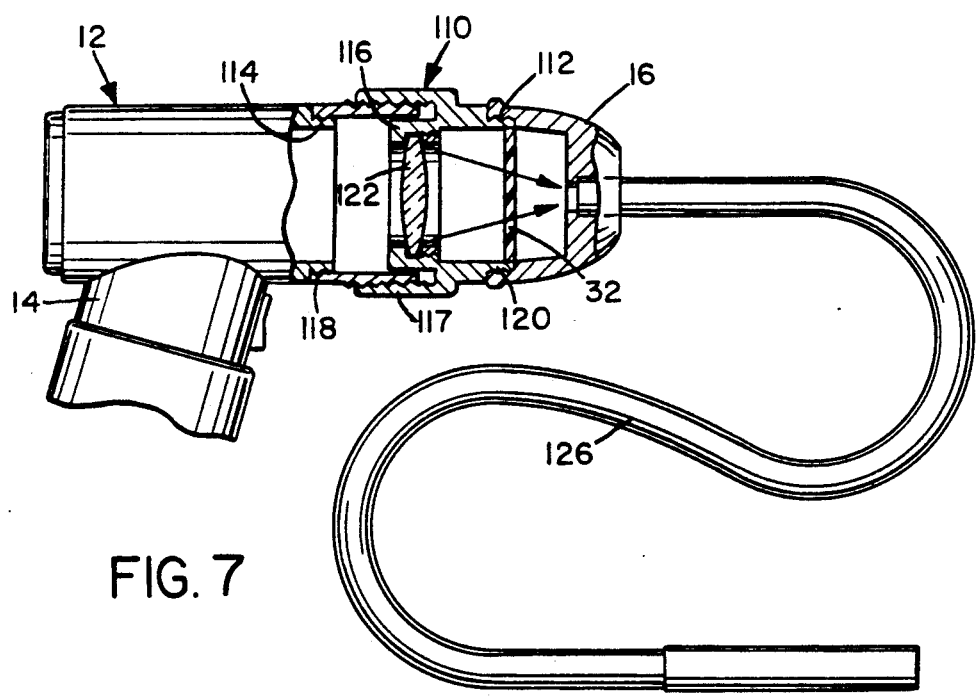
FIG. 7 is a side elevation view, with portions cut away, showing a light concentrating lens and flexible light guide attached to the light gun.

A focussing device 110 is preferably also provided for optional use with the light gun, as best illustrated in FIG. 7. Light gun casing is in two parts, handle part 14 and nose cone 16, and these parts are normally releasably secured together via internal screw threads 112 at the end of nose cone 16 and external screw threads 114 at the end of handle part 14. Focussing device 110 is designed to fit between the handle part 14 and nose cone 16 as illustrated in FIG. 7, and basically comprises cylindrical inner and outer sleeves 116, 117 with internal threads 118 at one end designed for mating with the external threads 114 at the end of handle part 14, and external threads 120 at its opposite end designed for mating with the internal threads 112 at the end of nose cone 16. A standard magnifying lens 122 is mounted in the sleeve 116, and outer sleeve or collar 117 is rotated to change the focus. The sleeve has a black outer surface. This device allows a lens to be mounted in the light path from the light source in the handle part of the light gun to focus the light onto the end of the fiber optic bundle, to provide a tighter focus, higher intensity emitted light beam. This also allows the dark dead spots which are normally present in fiber-optic bundles to be reduced, producing a better, higher intensity lighting effect. The device 110 also provides another location for mounting various light modifying filters as well as a heat protective filter, for example.

Another optional accessory for the lighting system is also illustrated in FIG. 7, in which the rigid light guide 18 is replaced by a flexible fiber optic cord 126 which has suitable fasteners at one end for releasably securing it to the nose cone 16 in place of light guide 18. Cord 126 also has an equivalent fastener at its opposite end to the fasteners on light guide 18, such as screw threads, for example, for coupling the cable to the various hood members. This cord will allow use of the lighting system for underwater filming or photography, for example.

Figure 8:
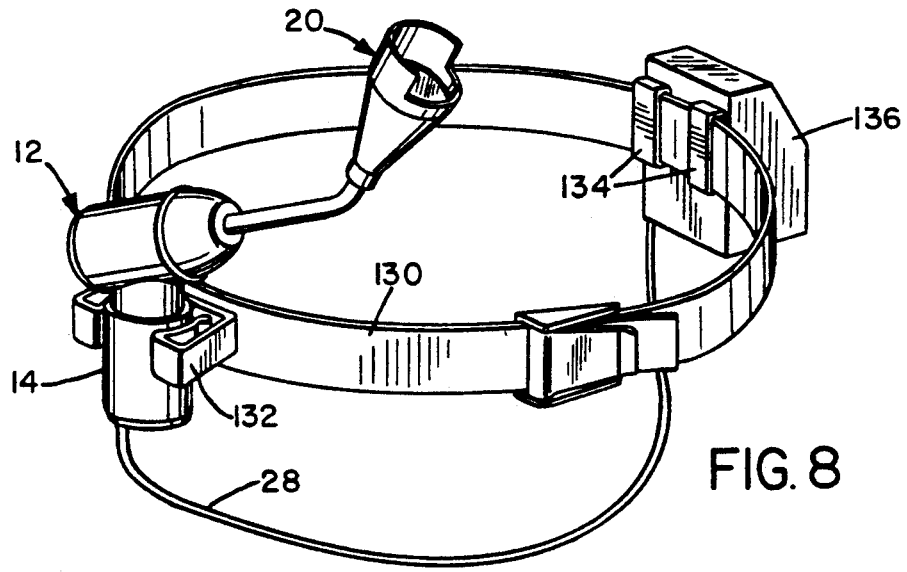
FIG. 8 illustrates a carrying belt with the light gun and a power supply attached.

The lighting system may be conveniently carried by means of belt 130, as illustrated in FIG. 8. Belt 130 is designed to fasten around the waist or over the shoulder of a user, and has a generally C-shaped spring clip 132 for snap engagement with the light gun handle 14. The belt also has suitable fastener brackets 134 to which an optional battery pack 136 can be attached, for outdoor use where no convenient mains power source is available.

This lighting apparatus or kit has great versatility in allowing a large number of different lighting effects to be used in a light painting procedure. In light painting, exposures of the same scene with different areas illuminated are made and combined with a uniformly lit exposure to produce a unique and attractive end result. With this apparatus, a narrow light beam can be directed across or onto an object or part of a scene to be highlighted before making an exposure. Alternatively, a circular or square beam, or several beams, may be directed at an object or part of a scene to produce a spotlight or speckled effect. In each case, the light may be sharp or diffuse, and color gels or other filters may be used via hood member 20 or hood member 24 for different effects. Since two hood members may be attached to the light gun in series, and each hood member has the capability of mounting two or more light modifying filters or templates, a large range of beam adjustment is possible with a relatively simple arrangement. The apparatus may be used with either daylight or tungsten film, using an appropriate color correction filter in nose cone 16. The lighting apparatus may be used in either still or video/film photography.

The unit is relatively lightweight and portable, and may be used either with a long extension cable secured to voltage regulator, or alternatively with belt mounted, battery power supply for complete mobility. Since it is completely black, additional light will not be reflected onto a scene and, if the scene has a black backdrop, the apparatus will not be visible in the resultant image. The angled end of the light guide allows the position of the light beam to be adjusted simply by rotating the light guide, allowing precise positioning for special effects.

Although a preferred embodiment of the invention has been described above, it will be understood by those skilled in the field that modifications may be made to the disclosed embodiment without departing from the scope of the invention, which is defined by the appended claims.

We claim:

1. A light directing apparatus for directing light in the visible light spectrum to illuminate a scene for still or video photography, comprising:

a light directing gun having a handle for gripping by a user, a visible light source in the gun for generating visible light rays, a rigid light guide for directing a light beam from the gun, and a power supply input for connecting the light source to a power supply;

the light guide having first coupling means at its outer end;

at least one hood member having second coupling means at a first end for releasable mating engagement with the coupling means on the light guide, the hood member comprising a hollow member having a second end of larger dimensions than said first end for controlling the size and shape of a light beam; and at least one light controlling accessory for controlling the quality, size or shape of a light beam, the hood member having a mounting device intermediate its end for releasably mounting the light controlling accessory in the hood member to intercept a light beam transmitted through the hood member.

2. The apparatus as claimed in claim 1, including a plurality of light controlling accessories each comprising a flat plate, some of the plates having openings of different sizes and shapes for controlling the size and shape of the light beam emitted from the apparatus.

3. The apparatus as claimed in claim 2, wherein other plates have filters for controlling the color or quality of emitted light.

4. The apparatus as claimed in claim 1, including at least one additional hood member comprising a hollow member of larger dimensions than the first mentioned hood member said additional hood member having a longitudinal axis and mounting means for selectively mounting any one of a series of additional light controlling accessories in the additional hood member.

5. The apparatus as claimed in claim 4, wherein said additional hood member includes mating means at one end for releasable mounting engagement with an outer end of the first mentioned hood member.

6. The apparatus as claimed in claim 4, wherein said additional light controlling accessories comprise flat plates and said additional hood member has at least one slot intermediate its ends for slidably receiving a selected one of said plates in a direction transverse to the longitudinal axis of said additional hood member, the flat plates having dimensions corresponding to cross-sectional dimensions of said additional hood member at said slot.

7. The apparatus as claimed in claim 4, wherein one of said hood members is of circular cross-section and the other hood member is of rectangular cross-section.

8. The apparatus as claimed in claim 4, including two additional hood members of different dimensions.

9. The apparatus as claimed in claim 8, wherein said additional light controlling accessories comprise a first set of flat plates for selectively mounting in one of said additional hood members and a second set of flat plates for selectively mounting in the other additional hood member.

10. The apparatus as claimed in claim 9, wherein each additional hood member has at least one slot intermediate its ends for slidably receiving a selected one of the respective set of flat plates in a direction transverse to the longitudinal axis of said additional hood member.

11. The apparatus as claimed in claim 9, wherein said flat plates include light diffuser plates and plates having openings of different sizes and shapes.

12. The apparatus as claimed in claim 1, further including color correction filters for modifying the light for tungsten or daylight film, said light gun having mounting means for releasably mounting a selected one of said color correction filters in the light beam from the light source.

13. The apparatus as claimed in claim 1, wherein said rigid light guide is releasably secured to said light gun, and further including a flexible, fiber optic cable for selectively securing to said light gun in place of said rigid light guide, said fiber optic cable having securing means at one end for releasably securing the cable to the light gun and coupling means at the opposite end for releasably coupling said cable to said hood member.

14. The apparatus as claimed in claim 1, wherein said gun has a handle part in which said light source is mounted and a nose cone releasably secured to said handle part, and further including focussing means for selectively mounting between the handle part and nose cone of said gun for focussing the light rays emitted from said light source.

15. The apparatus as claimed in claim further including a carrying belt for releasably carrying said light gun.

* * * * *